United States Patent Office 3,437,496
Patented Apr. 8, 1969

3,437,496
PROCESS FOR PREPARING STREWABLE WAXES FOR BRIGHT DRYING POLISH EMULSIONS
Guido Von Rosenberg, Gersthofen, and Wolfgang Sapper, Aystetten, Germany, assignors to Farbwerke Hoechst Aktiengesellschaft vormals Meister Lucius & Bruning, Frankfurt am Main, Germany
No Drawing. Filed May 5, 1964, Ser. No. 365,188
Claims priority, application Germany, May 16, 1963, F 39,751
Int. Cl. C09g 1/08; C08h 9/06
U.S. Cl. 106—10
10 Claims

ABSTRACT OF THE DISCLOSURE

A process for preparing a strewable wax emulsion, the wax and emulsions obtained therefrom whereby:
(a) 74–90 parts of an ester wax having an acid value of not less than 35 or greater than 100, and
(b) 6–20 parts of an oxidized polyethylene wax having an acid value of 10–80,
(c) 1–6 parts of balsamic resin, and
(d) 3–7 parts of a non-ionic wax emulsifier are admixed in the molten state.
The resulting cooled solid wax product may be strewn in boiling water with agitation in the presence of a volatile amine to obtain a bright drying polish emulsion.

---

The present invention relates to a process for preparing strewable waxes for bright drying polish emulsions.

Bright drying polish emulsions can be prepared in a simple manner to obtain reproducible emulsions by stirring bright drying ester waxes containing non-ionic emulfiers present in the form of flakes or another strewable form, into boiling water and then cooling the emulsions to room temperature. Emulsifier-containing waxes which are suitable for this purpose are hereinafter referred to as "strewable waxes."

Strewable waxes known and used in the art are generally ester waxes based on crude montan wax having an acid value of 20 to 35 and a non-ionic wax emulsifier such as the product obtained by an addition reaction of 15 to 18 moles of ethylene oxide with a commercially available fat alcohol having 16 carbon atoms. The ester wax and emulsifier contained in such known strewable waxes are commonly found in a ratio of approximately 86–84:14–16 parts by weight and the waxes are brought into a strewable form on a flaking roller.

Emulsions made from strewable waxes of the aforesaid kind usually have a weakly acid reaction and a translucent, milky appearance.

Sometimes it is desired to prepare weakly alkaline transparent bright drying polish emulsions from strewable waxes since alkaline emulsions are less corrosive and less liable to bacterial attack than acid emulsions. Moreover, transparent emulsions give the appearance of dryness and are, therefore, often thought to be more attractive and to sell more easily than opaque emulsions.

The known strewable waxes do not meet the requirements of the aforesaid kind. The quality and quantity of the ester wax component and the emulsifier component contained in the known strewable waxes are adjusted so as to enable a maximum gloss on drying to be obtained and are consequently definitely determined. When a known strewable wax is emulsified in the presence of an alkali the gloss on drying and the resistance to water of the resulting films are impared. The gloss on drying is likewise diminished when the emulsions are stored.

The present invention provides a process for preparing a strewable wax for the preparation of bright drying polish emulsions, which contain an ester wax and a non-ionic wax emulsifier. According to the process of the invention 74 to 90 parts by weight of an ester wax having an acid value within the range of 35 to 100, preferably 70 to 100, 6 to 20 parts by weight of an oxidized polyethylene wax having an acid value within the range of 10 to 80, preferably 30 to 60, 1 to 6 parts by weight of balsamic resin and 2 to 9, preferably 3 to 7 parts by weight of a non-ionic wax emulsifier are mixed in the molten state and the mixture is allowed to solidify. The wax that is thus obtained can be emulsified by being strewn into boiling water which is violently moved mechanically, for example, by stirring, and which contains volatile amines which have preferably been added after the introduction of the wax. The wax may be shaped before being strewn into the boiling water. The resulting emulsion is transparent, has a high gloss on drying, is stable when stored and yields films that have good resistance to water.

The ester wax, which is preferably based on crude montan wax, which may, however, also be based on another wax, for example, a wax obtained by a synthesis according to Fischer-Tropsch, is prepared in known manner by subjecting the corresponding acid wax which has been obtained by the oxidation of crude montan wax with chromic acid, to an esterification with a glycol, preferably a glycol containing 2 to 6 carbon atoms, in particular a diol containing 2 to 4 carbon atoms, for example, ethylene glycol, butylene glycol or a mixture thereof. The esterification is controlled in such a way that the ester wax obtained has the desired acid value.

The ester wax is then mixed with the oxidized polyethylene wax, a balsamic resin and non-ionic wax emulsifier, all the substances being present in the molten state. The four components can be mixed in any order of sequence. In general, the non-ionic wax emulsifier is added to the mixture of ester wax, oxidized polyethylene wax and balsamic resin.

As oxidized polyethylene wax having the above-mentioned acid value there is preferably used one having a molecular weight within the range of 2000 to 4000 and a solidification point within the range of 84° to 94° C. Oxidized polyethylene waxes having a molecular weight and/or a solidification point above or below the aforesaid ranges may also be used although the use of such waxes does not enable any particular advantages to be obtained.

As non-ionic emulsifiers there are used in particular polyoxethylated higher fat alcohols containing 15 to 17, preferably 16 carbons atoms. In many cases the degree of oxethylation is within the range of 10 to 30, preferably 12 to 22 moles of ethylene oxide per mole of fat alcohol. The quantity of the wax emulsifier contained in the mixture before the emulsification process is low as compared with the quantity of wax emulsifier that is present in known waxes and it would not be sufficient to emulsify the known waxes.

The melt of the mixture of the aforesaid four components—the indications concerning the quantity are calculated on 100 parts by weight of the mixture—is allowed to cool and a solid strewable wax in the form of a powder or, if it has been shaped, for example, on a flaking roller, in the form of flakes or grains is obtained.

The emulsification is advantageously brought about by strewing the wax, while stirring continuously, into boiling water to which appropriate volatile amines, for example, those described in "Seifen, Fette, Öle, Wachse" (1952), pages 637 to 639, and (1953), pages 15 to 19, are added, the amines being advantageously added after the wax has been strewn into the water. As examples of suitable volatile amines there may be mentioned diethyl aminoethanol, aminomethyl propanol and 3-methoxy propylamine. It is, however, also possible first to introduce the amines into boiling water and then to strew in the wax. The emulsification process can be accelerated by the addition of a small quantity of caustic potash to the emulsifying water, if this should be necessary for some reason or other, for example, because of the apparatus. When the emulsification is terminated the emulsion is quickly cooled to room temperature.

In order to improve the properties of the emulsion to wet, to spread and to form films a known ammoniacal resin solution and a known plastic dispersion may be added in the usual manner to the emulsion.

The following example serves to illustrate the invention but it is not intended to limit it thereto.

EXAMPLE

Crude montan wax was oxidized with chromic acid until it had an acid value of 115 and then it was esterified with ethylene glycol until its acid value was 90. 10.30 parts by weight of the resulting ester wax were mixed at 120° C. with 1.35 parts by weight of an oxidized polyethylene wax (molecular weight about 3000, acid value 48, saponification value 90, melting point in the open end capillary tube 105° C., solidification point 92° C.), 0.35 part by weight of balsamic resin and 0.4 part by weight of a non-ionic wax emulsifier (adduct obtained by the reaction of 17 moles of ethylene oxide with a commercially available alcohol containing 16 carbon atoms). The mixture was conveyed over a flaking roller and thereby cooled to room temperature.

In order to prepare a bright drying polish emulsion from the strewable wax thus obtained 12.0 parts by weight of the wax were strewn into 88.0 parts by weight of boiling water, while stirring continuously. To this mixture 1.9 parts by weight of diethyl aminoethanol were added. The emulsification process could be accelerated by adding to the emulsifying water, prior to the introduction of the wax, 0.1 part by weight of caustic potash.

What we claim is:

1. A process for preparing a strewable wax for the manufacture of bright drying polish emulsions containing an ester wax and a polyoxethylated higher fatty alcohol of 15–17 carbon atoms; comprising admixing in molten state 74–90 parts by weight of ester wax having an acid value of 35–100; 6–20 parts by weight of oxidized polyethylene wax having an acid value of 10–80, 1–6 parts by weight of balsamic resin; and 2–9 parts by weight of the polyoxethylated higher fatty alcohol; and effecting solidification of the resulting wax product.

2. The process of claim 1, wherein the ester wax has an acid value of 70–100.

3. The process of claim 1, wherein the oxidized polyethylene wax has an acid value of 30–60.

4. A process as claimed in claim 3, wherein the oxidized polyethylene wax has a molecular weight within the range of 2000 to 4000 and a solidification point within the range of 84° to 94° C.

5. A process as claimed in claim 1, wherein the non-ionic wax emulsifier is used in a quantity of 3 to 7 parts by weight.

6. A process as claimed in claim 1, wherein the ester wax used for the preparation of the mixture is based on crude montan wax.

7. Aqueous bright drying polish emulsions that contain a strewable wax prepared by the process of claim 1, and a volatile amine.

8. Aqueous bright drying polish emulsions as claimed in claim 7, in which the volatile amine is an amine selected from the group consisting of diethyl aminoethanol, aminomethyl propanol and 3-methoxy propylamine.

9. A process for the preparation of bright drying polish emulsions which comprise strewing the wax product of claim 1 into boiling water and adding a volatile amine selected from the group consisting of diethyl-aminoethanol, aminomethylpropanol, 3-methoxypropylamine, morpholine and triethanolamine to the resulting mixture.

10. A process as claimed in claim 9, wherein the strewable wax is shaped before being strewn into boiling water.

References Cited

UNITED STATES PATENTS

| | | | |
|---|---|---|---|
| 2,925,349 | 2/1960 | Koenig et al. | 106—10 |
| 2,963,379 | 12/1960 | Kaupp et al. | 106—270 X |
| 3,004,856 | 10/1961 | Zinnert | 106—270 |
| 3,053,681 | 9/1962 | Kaupp et al. | 106—270 X |
| 3,060,046 | 10/1962 | Kaupp et al. | 106—270 |
| 3,062,671 | 11/1962 | Kaupp et al. | 106—270 X |
| 3,143,431 | 8/1964 | Kaupp et al. | 106—8 |
| 3,300,321 | 1/1967 | Von Rosenberg et al. 106—10 X |  |

JULIUS FROME, Primary Examiner.

J. B. EVANS, Assistant Examiner.

U.S. Cl. X.R.

106—268, 270, 271